Dec. 1, 1970  E. L. BISHOP  3,543,576
TIRE TESTING APPARATUS AND METHOD

Filed May 3, 1966  4 Sheets-Sheet 1

INVENTOR
EARL L. BISHOP
BY
Teare, Teare & Sammon
ATTORNEYS

Dec. 1, 1970  E. L. BISHOP  3,543,576
TIRE TESTING APPARATUS AND METHOD
Filed May 3, 1966  4 Sheets-Sheet 3

INVENTOR
EARL L. BISHOP
BY
Teare, Teare & Sammon
ATTORNEYS

United States Patent Office 3,543,576
Patented Dec. 1, 1970

3,543,576
TIRE TESTING APPARATUS AND METHOD
Earl L. Bishop, Cuyahoga Falls, Ohio, assignor, by mesne assignments, to The B. F. Goodrich Company, New York, N.Y., a corporation of New York
Filed May 3, 1966, Ser. No. 547,213
Int. Cl. G01m 17/02
U.S. Cl. 73—146    17 Claims

ABSTRACT OF THE DISCLOSURE

A tire testing apparatus including a frame with a power driven shaft mounted for rotation on the frame. A support member is disposed adjacent one end of the shaft adapted for mounting an inflatable member to be tested. A carriage mounted for reciprocal movement on the frame and carrying a pressure-applying wheel for pressure engagement with the inflatable member. Electrical pressure-responsive devices operably coact with the pressure-applying wheel for measuring force variations imparted by the inflatable member upon pressure engagement by the pressure-applying wheel.

---

This invention relates to tire testing apparatus, and more particularly relates to an apparatus and method for testing and grading tire and/or wheel non-uniformity or the like.

The increase in automotive production, the development of smoother roads and superhighways, and the resulting increase in normal driving speeds have contributed materially to the present concern for improved tire and/or wheel dynamics and construction. In the past, chassis design and/or construction has been concerned mainly with making certain that the tire could be properly mounted on assembly plant equipment, and with controlling the tire (static) unbalance. Heretofore, the tires were checked for ride, handling and noise characteristics. However, a more recent problem relates to what is often termed "tire aesthetics"—that which pertains to the effect of tire and/or wheel non-uniformity upon the sound and/or vibration in the vehicle. Moreover, tire and/or wheel non-uniformities (e.g., such as slight variations in stiffness over a tire and/or wheel surface) have a pronounced effect as road "jolt" and "bounce" diminish. These non-uniformities are manifested by vibrations transmitted through the vehicle components, and subsequently to its passengers. Such vibrations are not only detrimental to the vehicle components and to its passengers, but may become dangerous, particularly at high speed travel.

It has been recognized, heretofore, that it is extremely difficult, if not impossible, to mass produce perfectly uniform tires and/or wheels due to the great number of variables, such as in the processing and/or compounding. Moreover, it has been found that the various related vibratory systems of the vehicle and its mountings should avoid natural frequencies that might synchronize objectionally with the natural tire and/or wheel frequencies. Hence, it has been found that tire and/or wheel non-uniformity characteristics which are most likely to produce such objectionable synchronisms should be avoided.

It is contemplated, therefore, in the present invention to provide an apparatus and method for testing tire and/or wheel non-uniformity characteristics, grading such non-uniformity characteristics into predetermined non-uniformity grade levels, and correlating such non-uniformity grade levels with a particular vehicle type (model) so as to minimize the effect of the aforementioned sound and/or vibrational forces on the vehicle and its passengers.

Accordingly, an object of the present invention is to provide an apparatus for testing tire and/or wheel non-uniformity characteristics of the character described which is of a rugged construction and economic to produce; which provides accurate and high quality movement from machine to machine; which may be readily adapted to determine the level of non-uniformity to which the tire and/or wheel has been manufactured; which minimizes the need for destructive analysis; and which substantially reduces time and effort heretofore required to determine tire and/or wheel non-uniformity characteristics.

Another object of the present invention is to provide a method for testing and grading tire and/or wheel non-uniformity characteristics of the character described, which automatically measures independently and/or simultaneously radial and/or lateral force variations of the tire; which measures automatically and independently and/or simultaneously with such measured force variations, loaded radial and/or lateral run-out of the tire; and which automatically records such measurements for grading into predetermined non-uniformity levels so that tires and/or wheels within such grade levels may be correlated for use with particular vehicle types that are most compatible with such non-uniformity characteristics.

Other objects and advantages of the present invention will be apparent from the following description taken in conjunction with the accompanying drawings, wherein:

FIG. 5 is a vertical section view taken along the plane of line 5—5 of FIG. 4.

Figure 1:
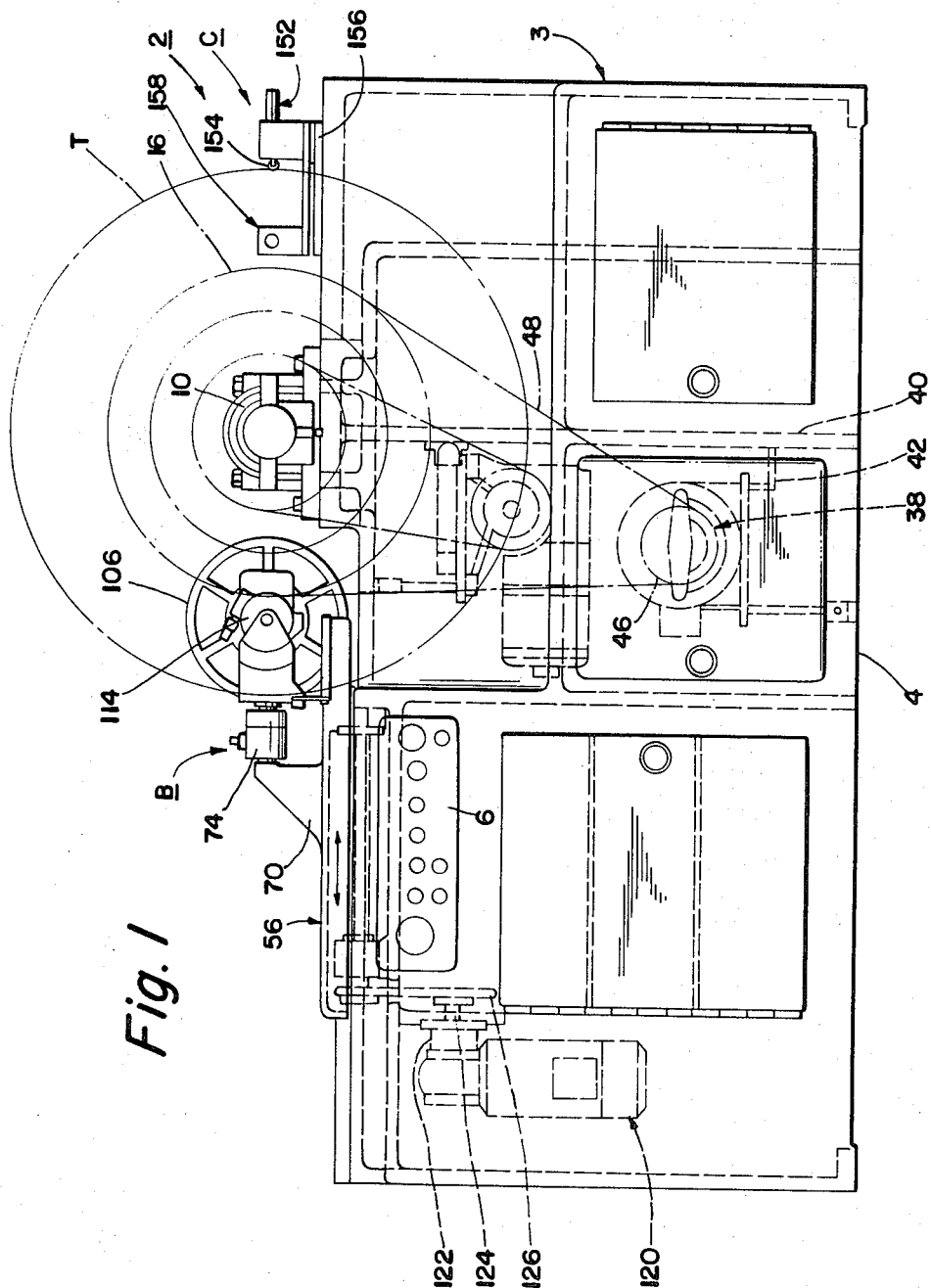
FIG. 1 is a front elevation view of the testing apparatus of the present invention, and showing a tire and/or wheel (broken-line) mounted thereon for testing and/or grading thereof.
Figure 2:
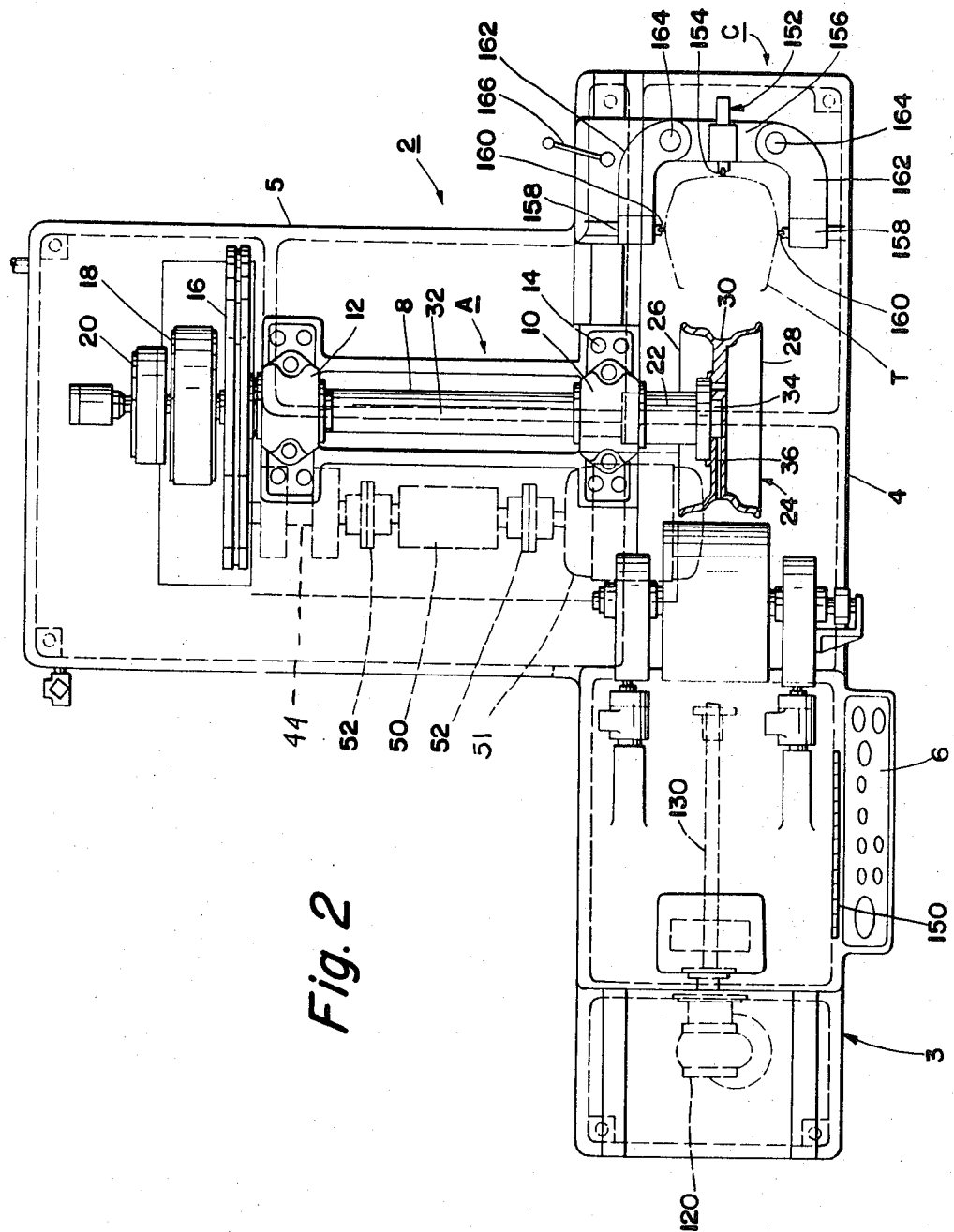
FIG. 2 is a top plan view of the testing apparatus shown in FIG. 1.

Referring then again to the drawings and in particular to FIGS. 1 and 2 thereof, the testing apparatus, designated generally at 2, is shown with a tire and/or wheel T (broken-line) mounted for testing thereon. As shown, the apparatus 2 includes a rigid frame 3 having connected frame sections 4 and 5 which together define a generally T-shaped (FIG. 2) configuration in top plan. The frame section 4 may include a suitable control panel 6 adjacent its front side for actuating the various components of the apparatus in timed relationship. The frame 3 generally mounts a support assembly A (FIG. 2) for mounting the tire and/or wheel T, a load wheel assembly B (FIG. 1) for applying (radial) loadings and for measuring radial and/or lateral force variation, and a load pickup-assembly C for measuring radial and/or lateral run-out on the tire and/or wheel to be tested.

As shown in FIGS. 1 and 2, the support assembly A may comprise an arbor 8 journaled for rotation about its longitudinal axis by a pair of laterally spaced journal members 10 and 12 attached by suitable fasteners 14, such as bolts, on the frame section 5. One end of the arbor 8 may fixedly mount driven pulleys 16, 18 and a clutch 20. The other end of the arbor 8 may be provided with a flanged head 22 to which may be attached a precision chuck 24. The chuck 24 may include a pair of oppositely disposed rim members 26 and 28 integrally connected together by an annular body portion 30 for mounting the tire and/or wheel T thereon. The chuck 24 may be of a size to accommodate passenger tires, such as 4.40 by 10 to 7.00 by 16, and light truck tires, such as 7.50 by 17 or 8.00 by 19.5, as desired.

To inflate and/or deflate the tire and/or wheel T mounted on the chuck 24, a conduit 32 may be disposed through the arbor 8 and into communication with a chamber 34 provided in the body 30 of the chuck 24. A passageway 36 may communicate at one end with the chamber 34 and extend radially towards its other end through the body 30 of the chuck 24 and onto the outer peripheral surface of the chuck 24. By this arrangement, fluid under pressure may be transmitted from a suitable source (not shown) for inflating the tire and/or wheel to the desired pressure. For example, the tire and/or wheel may be inflated to a pressure up to 60 p.s.i. dependent upon the (radial) loadings and/or on the tire size.

Reversible, rotary turning movement of the chuck 24 may be accomplished by a power unit 38, such as a five H.P.-1800 r.p.m.-AC motor, mounted on a cross-member 40 which may be attached to the frame section 4 by means of a bracket 42. The motor will have mounted upon it a drive pulley 46. A flexible belt 48 (FIG. 1) will be trained around the drive pulley 46 and around the respective driven pulley 16 disposed on the arbor 8. With this drive arrangement, the chuck 24 may be operated at a relatively high speed, such as 400 r.p.m., during the warm-up cycle. When tire force variation measurements are taken, the chuck 24 may be operated at relatively slow speeds, such as between about 6.6 to 66 r.p.m., during the measuring cycle. This may be accomplished by means of a motor unit 51, such as a D.C. variable speed motor, connecting through a shaft 44 and timing belt drive to the driven pulley 18 and clutch 20 mounted on arbor 8. A torquemeter 50 (FIG. 2) may be attached, such as by split-couplings 52, to the drive shaft 44 for measuring the torque effects imparted to the chuck 24 during rotation thereof, as desired.

The wheel assembly B for applying (radial) loadings to the tire and/or wheel and for measuring radial and/or lateral force variation thereon may comprise a carriage 56 mounted for radial, reciprocal movement on the frame section 4. As best seen in FIG. 5, this axial shifting movement may be accomplished by a pair of elongated, wear-resistant, key-blocks 58 attached to the underside of the carriage 56, such as by bolts 60, so as to slide in slots 62 provided in a plate 64 attached to the frame section 5. To guide and steady sliding movement of the blocks 58, within the slots 62, a pair of elongated, wear-resistant wedge-blocks 66 may be disposed within the slots 62 and attached, such as by bolts 68, to the plate 64.

Figure 3:
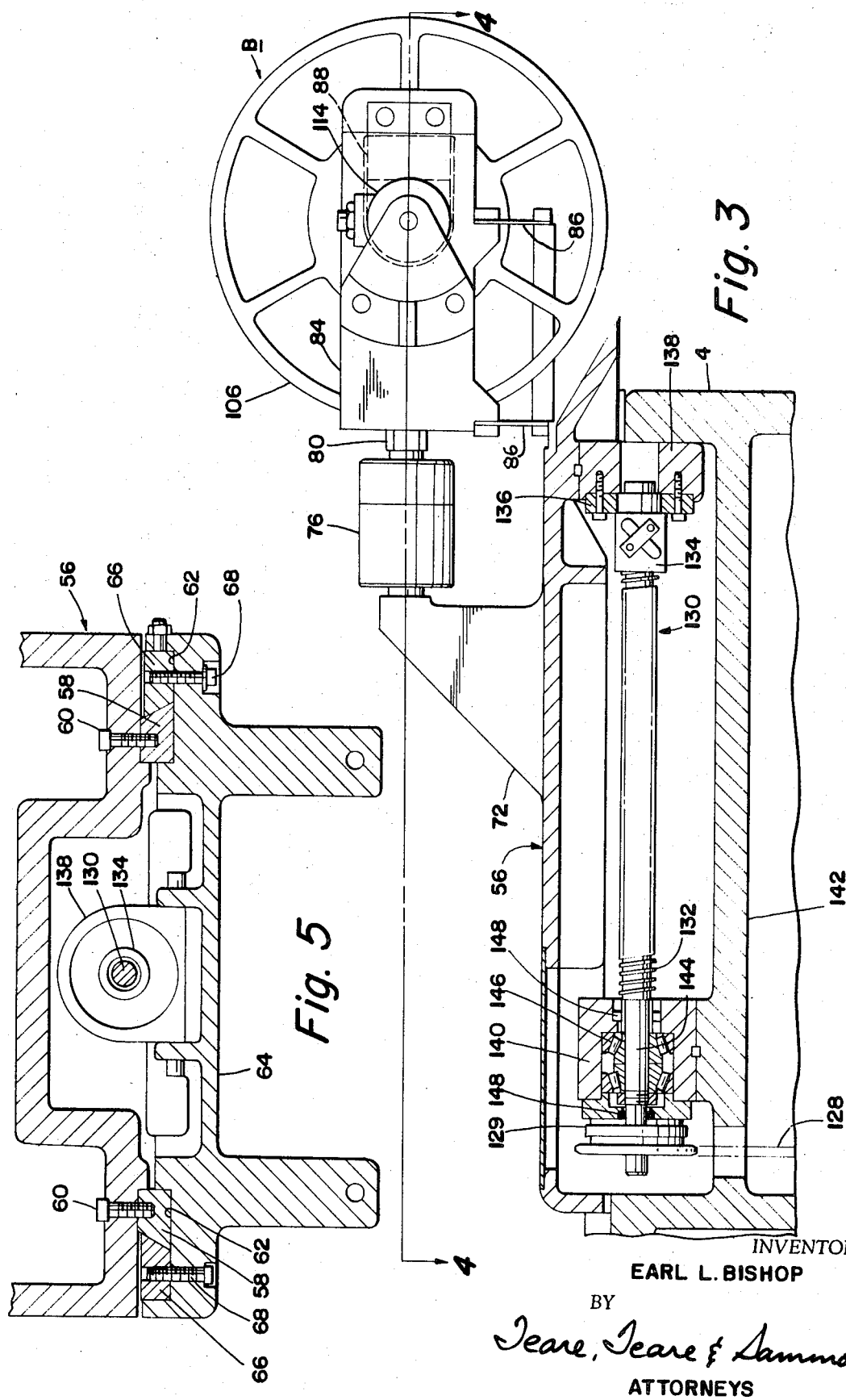
FIG. 3 is an enlarged fragmentary view partly in section showing the novel load wheel assembly of the invention.
Figure 4:
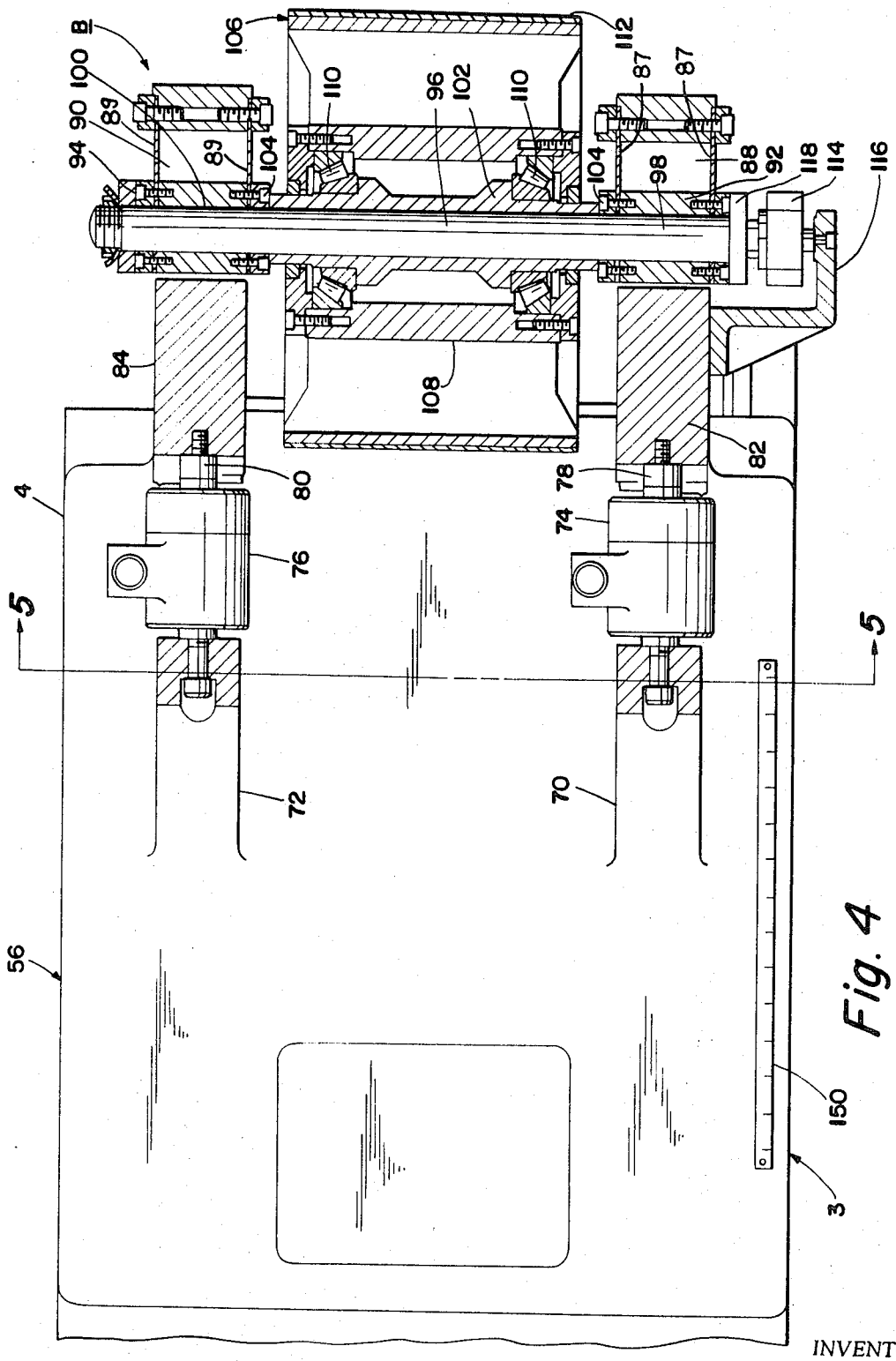
FIG. 4 is a top plan view partly in section of the novel load wheel assembly of FIG. 3.

A pair of laterally spaced arms 70 and 72 (FIG. 4) extend upwardly from the carriage 56, each of which mounts an electrical, pressure sensitive load cells 74 and 76 which extend axially therefrom for measuring radial force variation. The load cells 74 and 76 may each be operatively coupled at one end, as at 78 and 80, to a pair of laterally spaced blocks 82 and 84 which may be attached (FIG. 3) to the carriage 56 by suitable resilient flexures 86 (only one shown). The blocks 82 and 84 may be provided adjacent their outer ends with a pair of oppositely disposed openings 88 and 90 each of which may receive a hollow bearing blocks 92 and 94 for lateral movement therein. The bearing blocks 92 and 94 are supported from blocks 82 and 84, respectively, by two pairs of resilient flexures 87 and 89 attached thereto, such as by bolts 104, which provide for lateral movement of the blocks 92 and 94. A shaft 96 may extend transversely between bearing blocks 92 and 94 and through aligned bores 98 and 100 provided in the respective bearing blocks 92 and 94 so as to be axially movable therewith and relative to the blocks 82 and 84. A hollow sleeve 102 may be disposed around the shaft 96 and disposed adjacent its opposed ends against the respective bearing blocks 92 and 94. A light weight, precision wheel 106 may be comprised of a metallic material, such as magnesium. Wheel 106 includes an integral, annular hub 108 which may be journaled, as at 110, on the sleeve 102, such as by a roller bearing and race construction, as best seen in FIG. 4. The wheel 106 may be covered with a smooth, wear-resistant outer casing 112 to provide a precision, uniform surface for measuring radial and/or lateral force variation on the tire and/or wheel T.

To measure lateral force variation, another electrical, pressure resistant load cell 114 may be attached by means of a bracket 116 to an adjacent end of shaft 96. The load cell 114 may be operatively coupled to a flanged head 118 provided on the shaft 96. By this arrangement, any lateral (axial) movement of the wheel 106 is automatically transmitted to the lateral load cell 114, and any radial movement of the wheel 106 will be transmitted through the bearing blocks 92, 94, flexures 87, 89, blocks 82, 84 conjunctively to the load cells 74 and 76, as will hereinafter be more fully described.

Reciprocal movement of the carriage 56, may be achieved by a power unit 120, such as a ½ H.P.-D.C. motor, mounted interiorly of the frame section 4 (FIG. 1) by a bracket 122, the drive shaft 124 of which mounts a driving pulley 126 adjacent one end thereof. A flexible belt 128 (FIG. 3) may be trained around the pulley 126 and around a driven pulley 129 mounted on one end of a drive screw 130. The screw 130 is of an elongated, cylindrical construction which is threaded, as at 132, intermediate its ends. One end of the screw 130 may be disposed for threading coacting engagement within a correspondingly threaded block 134 which is attached by means of a plate 136 to an integral flange 138 depending downwardly from the carriage 56. The other end of the screw 130 may extend through a bearing block 140 attached to an integral cross-member 142 of the frame section 4. The screw end may be journaled, as at 144, for rotation within the bearing block 140, such as by a roller bearing and race construction 146, which may be sealed adjacent its opposed ends, such as by O-rings 148, to prevent entrance of foreign materials into the bearing. Upon actuation of the power unit 120, the screw 130 may be rotated in one direction which causes the threaded block 134, and hence the carriage 56 to move axially in one direction; while rotation of the screw 130 in the opposite direction causes the bearing block 134, and hence the carriage 56 to move axially in the opposite direction. By this arrangement, the carrier 56 mounting the load wheel 106 may be moved axially toward and away from the tire and/or wheel T mounted on the chuck 24. The carriage 56 by this arrangement for instance, may travel at a speed of about 26 inches per minute toward and away from the tire, as desired. The frame section 4 (FIGS. 2 and 4) may be provided on its upper surface with a suitable numerical indicator, as at 150, to enable the operator to selectively set the extent of axial movement of the carriage 56 so as to provide a predetermined load force against the tire and/or wheel to be tested.

The pick-up assembly C for measuring radial and/or lateral load run-out (dimensional deviation) of the tire and/or wheel T (FIGS. 1 and 2) may comprise a radial indicator 152 having a pressure sensitive probe tip 154 adapted to engage the tread surface of the tire. The indicator 152 may be mounted on a bracket plate 156 attached to the upper surface of the frame section 4. A pair of laterally spaced, oppositely disposed lateral indicators 158 having similar pressure sensitive probe tips 160 may be disposed for pivotal movement into engagement with the opposed side walls of the tire T. As best seen in FIG. 2, the lateral indicators 158 may each be mounted on a toggle arm 162 which is pivotally connected, as at 164, to the bracket plate 156 for pivoting the probe tips 160 toward and away from the side walls of the tire upon actuation of a control lever 166. By this arrangement, loaded run-out on the tread and/or side wall surface of the tire may be simultaneously measured (mechanically or electro-mechanically) along with the "force" variation measurement achieved by the load wheel assembly B. Accordingly, measured radial and/or lateral force variation (force deviation) can be effectively correlated with measured load radial and/or lateral run-out (dimensional deviation) for grading tires and/or wheels into particular non-uniformity levels. By this system, for example, certain tire and/or wheel non-unformity characteristics such as stiffness, can be more effectively determined when radial and/or lateral force variations are measured in relation to the corresponding radial and/or lateral run-out variations.

In a typical testing and/or grading application, the tire and/or wheel T may be mounted on the precision chuck 24 and inflated thereon to a pre-set level, such as up to 60 p.s.i., dependent upon the tire size. The other power unit 120 may be actuated for driving the screw 130, and hence for moving the carriage 56 mounting the load wheel 106 into engagement with the tire T. Loading may be accomplished by: (1) loading to a pre-set force, such as up to 2,000 lbs.; or (2) loading to a constant pre-set deflection (tire axle-to-test wheel height), such as about 1 inch. The former method of loading is preferred as it provides a more sensitive measurement of tire-to-tire dimensional variation. Upon loading, the tire T is caused to rotate. The power unit 38 is actuated to rotate the tire and/or wheel in one direction, such as clockwise, at a relatively high speed, such as at 400 r.p.m., for a period of about 2 minutes to complete the warm-up cycle. The chuck 24, will then be rotated by drive 51 at a relatively low speed, such as at 6.6 to 66 r.p.m., to perform the measuring operations. This rotation (clockwise or counter-clockwise, or both) results in the tire non-uniformities causing force exerted by the tire (against the load wheel 106) to vary. These force variations are resolved into: (1) a radial component, perpendicular to the tread surface; and (2) a lateral component acting 90° relative to the radial force. The dynamically balanced load wheel 106 being free to move in both radial and lateral directions, the radial load cells 74 and 76 resist movement in the radial direction so as to detect and measure the radial force component exerted by the tire, while the lateral load cell 114 resists the movement in the lateral direction so as to detect and measure the lateral force component exerted by the tire. Such radial and/or lateral measurements may then be automatically transmitted to a control console (not shown) for recordation and subsequent tabulation into selected non-uniformity levels.

Simultaneously with measurement of the radial and/or lateral force variation, the radial 152 and lateral 158 indicators actuate upon engagement with the tread and side walls of the tire T to measure the loaded radial and/or lateral run-out variation imparted by the tire. Such detected and measured variations may also be transmitted to the control console for recordation and subsequent readings thereof.

For radial ply tires, as opposed to bias ply tires, the tire is preferably rotated in both directions, such as clockwise and counter-clockwise to measure the tire non-uniformities. The reason for this being that the circumferential belting which reinforces the radial ply tires adds another dimension to the non-uniformity characteristics of the tire.

At the completion of the measuring operations, the carriage 56 mounting the load wheel 106 may be moved radially, away from the tire T. The tire T may then be deflated and removed from the precision chuck 24, whereupon, another tire and/or wheel may be installed for another measuring operation.

The tested tires and/or wheels may then be moved to a marking station wherein a predetermined number of grade marks may be applied, such as to the bead area, to indicate the degree of non-uniformity thereof. Accordingly, the various grade marks represent the tire uniformity levels, each of which reflects various combinations of radial and lateral force variation. By this system, the particular non-uniformity level can be correlated for a particular model vehicle, thereby to provide a more efficient matching of tires and/or wheels to vehicle models.

The terms and expressions which have been used are used as terms of description and not of limitation, and there is no intention in the use of such terms and expressions of excluding any equivalents of any of the features shown or described, or portions thereof, but it is recognized that various modificataions are possible.

I claim:

1. An apparatus for testing the non-uniformity characteristics of an inflatable member, such as a tire or the like, comprising, a frame, a first shaft mounted for rotation on said frame, power means for driving said shaft, a support member disposed adjacent one end of said shaft for mounting an inflatable member, a carriage mounted for reciprocal movement on said frame in a substantially linear direction toward and away from said inflatable member, a second shaft resiliently and rotatably mounted on said carriage, said second shaft extending generally parallel to said first shaft and defining a generally fixed common plane therewith and with respect to said frame, a pressure-applying wheel mounted for substantially free rotation on said second shaft and adapted for resilient pressure engagement with said inflatable member upon movement of said carriage, and pressure-responsive means operably coacting with said second shaft for measuring force variations imparted by said inflatable member upon pressure engagement by said pressure-applying wheel.

2. An apparatus according to claim 1, including support means mounting the opposed ends of said second shaft on said carriage, and resilient support means operably coacting with said support means and said second shaft to enable angular displacement of the rotational axis of said second shaft substantially in said common plane and with respect to said first shaft upon engagement of said pressure-applying wheel with said inflatable member.

3. An apparatus according to claim 1, including a pair of pressure sensitive indicator members pivotally mounted on said frame on opposite sides of said inflatable member adapted for pivotal movement into engagement with the confronting side portions of said inflatable member for measuring lateral dimensional variations imparted by pressure engagement of said wheel with said inflatable member.

4. An apparatus according to claim 3, including another pressure sensitive indicator means disposed between said first pair of pressure sensitive indicator means adapted for engagement with a confronting end surface portion of said inflatable member for measuring radial dimensional variations imparted by pressure engagement of said wheel with said inflatable member.

5. In a method for testing non-uniformity characteristics in an inflatable member, such as a tire, wheel or the like, the steps comprising, inflating an inflatable member to a predetermined pressure, rotating the inflated member, applying a predetermined radial force against said inflated member, measuring the force variation imparted by said inflatable member upon application of radial force on said inflated member, the measurement of said force variation including simultaneously measuring the radial force components imparted by application of said radial force to said inflated member and the lateral force components imparted by application of said radial force to said inflated member, measuring the dimensional variation imparted to said inflated member upon application of said radial force to said inflated member, and wherein the measuring of said dimensional variation includes simultaneously measuring the radial dimensional variation of said inflated member and measuring the lateral dimensional variation of said inflated member.

6. In a method for testing non-uniformity characteristics in an inflatable member, such as a tire, wheel or the like, the steps comprising, inflating an inflatable member to a predetermined pressure, rotating the inflatable member, applying a predetermined radial force against said inflatable member, measuring the force variation imparted by said inflatable member upon application of radial force on said inflated member, and wherein said inflated member is first rotated and measured in one direction, and then rotated and measured in the opposite direction, and measuring the dimensional variation imparted to said inflated member upon application of said radial force to said inflated member, and wherein measurement of said dimensional variation includes simultaneously measuring the radial dimensional variation of said inflated member and measuring the lateral dimensional variation of said inflated member.

7. A tire uniformity testing machine for measuring radial and lateral force variations on a tire to be tested comprising, a frame, a first shaft mounted on said frame and power means for rotating said shaft about its longitudinal central axis, a chuck member mounted adjacent the free end of said shaft for mounting a tire thereon, a carriage mounted on said frame for movement radially toward and away from said chuck member and power means for driving said carriage, a force applying assembly mounted on and for movement radially with said carriage, said assembly including a pair of spaced, oppositely disposed support members resiliently mounted on said carriage for radial flexure-like movement with respect to said carriage, a second shaft extending transversely between said support members, the opposed ends of said shaft being resiliently mounted by said support members for lateral flexure-like movement with respect to said carriage, an annular force applying wheel mounted for rotation on said second shaft and adapted for movement toward and away from said chuck member for pressure applying engagement with said tire upon selective radial movement of said carriage, first pressure responsive load cell means disposed for operable coaction with each of said support members for measuring radial force variation imparted by pressure engagement of said wheel with said tire, and second pressure responsive load cell means disposed for operable coaction with an end of said second shaft for measuring lateral force variation imparted by pressure engagement of said wheel with said tire.

8. A tire uniformity testing machine in accordance with claim 7, wherein said support members each include transversely extending openings therein, and a block-like member disposed for movement in each of said openings so as to support the said opposed ends of said second shaft for said flexure-like movement within said openings.

9. A tire uniformity testing machine in accordance with claim 8, including at least one resilient flexure member disposed transversely in each of the openings of the respective of said support members and being connected at one end to the associated support member and at the other end to an associated one of said block-like members.

10. A tire uniformity testing machine in accordance with claim 8, including at least one resilient flexure member mounting each of said support members for said flexure-like movement on said carriage.

11. A tire uniformity testing machine in accordance with claim 7, wherein said first pressure responsive load cell means includes a pair of electrical pressure sensitive load cells operably connected at one end to each of the respective of said support members and mounted at the opposed end on a support means carried by said carriage.

12. An apparatus for testing nonuniformity characteristics of an inflatable tire comprising, a frame, shaft means mounted for rotation on said frame, power means for driving said shaft means, chuck means supported by said shaft means and adapted for mounting an inflatable tire thereon, support means carried by said frame, a rotatable member, flex plate means rotatably mounting said rotatable member on said support means to effect pressure engagement of said rotatable means with said inflatable tire, pressure responsive means operatively coacting with said rotatable means for measuring force variation imparted by said inflatable tire to said rotatable means by rotation of the tire while in pressure engagement with said rotatable means, the said pressure responsive means including at least one electrical pressure-responsive means including at least one electrical pressure-sensitive load cell for measuring radial force variation of said rotatable means, and at least one other electrical pressure-sensitive load cell for measuring lateral force variation imparted by pressure engagement of said rotatable means with said inflatable tire.

13. In an apparatus according to claim 12 wherein said support means includes carriage means operatively connected to said flex plate means for rotatably supporting said rotatable means, and said means to move said support means includes power operated means for driving said carriage means toward and away from said chuck means.

14. In an apparatus according to claim 12, wherein said shaft means includes an inlet passageway means disposed in communication with an outlet passageway means in said chuck means for admitting fluid under pressure to said inflatable member.

15. In an apparatus according to claim 12, including indicator means mounted on said frame and movable into engagement with said inflatable member for measuring dimensional variations imparted by pressure engagement of said rotatable means with said inflatable member.

16. In an apparatus according to claim 15, wherein said indicator means includes at least one pair of oppositely disposed, pressure sensitive probe elements adapted for engagement with the side portions of said inflatable member, and at least one other pressure sensitive probe element adapted for engagement with the end portion of said inflatable member.

17. In an apparatus according to claim 12, including indicator means mounted on said frame and adapted for engagement with said inflatable member for measuring dimensional variations imparted by pressure engagement of said rotatable means with said inflatable member.

References Cited

UNITED STATES PATENTS

| | | | |
|---|---|---|---|
| 2,251,803 | 8/1941 | Pummill | 73—146 |
| 2,695,520 | 11/1954 | Karsai | 73—146 |
| 3,206,973 | 9/1965 | Obarski | 73—146 |
| 3,375,714 | 4/1968 | Bottasso | 73—146 |

OTHER REFERENCES

Bajer, "The Control of Tire Non-Uniformity and a Passenger Car Manufacturer's Point of View," Society of Automotive Engineers, pp. 1–15, 1963.

DONALD O. WOODIEL, Primary Examiner